United States Patent [19]

Hillion

[11] Patent Number: 4,823,292

[45] Date of Patent: Apr. 18, 1989

[54] DATA PROCESSING APPARATUS WITH ENERGY SAVING CLOCKING DEVICE

[75] Inventor: Hervé Hillion, Eindhoven, Netherlands

[73] Assignee: U.S. Philips Corporation, New York, N.Y.

[21] Appl. No.: 86,440

[22] Filed: Aug. 17, 1987

[30] Foreign Application Priority Data

Aug. 18, 1986 [GB] United Kingdom ............... 8620056

[51] Int. Cl.⁴ .......................... G09G 3/00; G06F 1/00
[52] U.S. Cl. ..................................... 364/707; 307/592
[58] Field of Search ..................... 364/707; 307/592

[56] References Cited

U.S. PATENT DOCUMENTS 4,649,373  3/1987  Bland ................................. 364/707

OTHER PUBLICATIONS

Philips Data Hand Book IC14N, 1985, pp. 187–213.

Primary Examiner—Andrew J. James
Assistant Examiner—David Soltz
Attorney, Agent, or Firm—Thomas A. Briody; Jack E. Haken; Anne E. Barschall

[57] ABSTRACT

The energy consumption of a data processing apparatus, having a data processing element with an operating mode and a stop mode, in which latter mode RAM contents are saved but all other chip functions are inoperative, can be minimized by switching between the two modes and by adjusting the oscillator's frequency at the optimal value, depending among others, on the data processing apparatus' task.

14 Claims, 7 Drawing Sheets

1. $\quad 0 \leq \eta = \dfrac{2t_0 + t_1}{T} \leq 1$.

2. $\quad I_{av} = \eta I_{op} + (1-\eta) I_{stop}$.

3. $\quad I_{op} = \alpha f + \beta$.

4. $\quad I_{stop} = \theta \ll \beta$.

5. $\quad t_1 = \dfrac{NC}{f}$.

6. $\quad f \geq \dfrac{NC}{T - 2t_0}$.

7. $\quad I_{av} = \left(\dfrac{2t_0}{T} + \dfrac{NC}{fT}\right)(\alpha f + \beta) + \left(1 - \dfrac{2t_0}{T} - \dfrac{NC}{fT}\right)\theta$.

8. $\quad f_{opt} = \sqrt{\dfrac{(\beta - \theta)NC}{2t_0 \alpha}} \simeq \sqrt{\dfrac{\beta NC}{2t_0 \alpha}}$.

FIG.3A

9  $I_{av}(f_{opt}) \lesssim \dfrac{(\sqrt{2\beta t_0} + \sqrt{NC\alpha})^2}{T}.$ 10  $\left[ f_{opt} \geq \dfrac{NC}{T-2t_0} \wedge \dfrac{I_{av}(f) - I_{av}(f_{opt})}{I_{av}(f_{opt})} \leq \delta \right] \Longrightarrow$ $\left[ \text{Max}\left\{ P - \sqrt{P^2 - Q}, \dfrac{NC}{T-2t_0} \right\} \leq f \leq P + \sqrt{P^2 - Q} \right].$ $P = \sqrt{\dfrac{NC\beta}{2t_0\alpha}} + \delta \left( \sqrt{\dfrac{NC\beta}{2t_0\alpha}} + \dfrac{\beta}{2\alpha} + \dfrac{NC}{4t_0} + \dfrac{\Theta T}{4t_0\alpha} \right),$ $Q = \dfrac{NC\beta}{2t_0\alpha}.$ 11  $\left[ f_{opt} \leq \dfrac{NC}{T-2t_0} \wedge \dfrac{I_{av}(f) - I_{av}(\frac{NC}{T-2t_0})}{I_{av}(\frac{NC}{T-2t_0})} \leq \delta \right] \Longrightarrow$ $\left[ \dfrac{NC}{T-2t_0} \leq f \leq R + \sqrt{R^2 - Q} \right],$ $R \lesssim \dfrac{NC}{2T} + \dfrac{\beta T}{4\alpha t_0} + \delta \left( \dfrac{NC}{4t_0} + \dfrac{\beta T}{4\alpha t_0} \right).$

FIG. 3B

12  $I_{idle} = \Sigma f + \lambda$ .

13  $\widehat{I}_{av}(f) = \eta I_{op} + (1-\eta) I_{idle} =$ $= (\frac{2t_0}{T} + \frac{NC}{fT})(\alpha f + \beta) + (1 - \frac{2t_0}{T} - \frac{NC}{fT})(\Sigma f + \lambda)$ .

14  $\widehat{I}_{min} = \frac{2}{T}\sqrt{(\beta-\lambda)(\Sigma T + 2t_0\alpha)NC} + \frac{2t_0\beta}{T} + \frac{NC}{T}(\alpha - \Sigma) + \lambda$ .

15  $\left[ I_{av}(f) \leq \widehat{I}_{min} \right] \Rightarrow$ $\left[ V - \sqrt{V^2 - H} \leq f \leq V + \sqrt{V^2 - H} \right]$ .

$V = \sqrt{\frac{(\beta-\lambda)(\Sigma T + 2t_0\alpha)NC}{2t_0\alpha}} + \frac{\lambda T}{4t_0\alpha} - \frac{NC\Sigma}{4t_0\alpha}$ $H = \frac{NC\beta}{2t_0\alpha}$

FIG.3C

DATA PROCESSING APPARATUS WITH ENERGY SAVING CLOCKING DEVICE

BACKGROUND OF THE INVENTION

1. Field of the Invention

The invention relates to a data processing apparatus comprising:
a data processing element, having an operating mode and a stop mode, said element comprising a data input a first data output, a reset signal input, a clock input a stop signal output and first power supply terminal means;
oscillator means for feeding said clock input with clock pulses, said oscillator means having second power supply terminal means;
a data receiving module for receiving external data, said module having a second data output connected to the data input;
wherein said data processing element has reset means for under combined control of a series of clock pulses and a reset signal on said reset input attaining an initial state within a predetermined line interval, the data processing apparatus being suited for economically consuming energy.

2. Prior Art

Reducing energy consumption is of interest in environments of limited available power, e.g. in implanted medical devices, portable equipment or space satellites and in devices in which energy dissipation should be limited, e.g. in VLSI circuits.

A first method for reducing energy consumption in a clocked data processing apparatus, designed in a low-power technology, would be to lower the frequency of the clock as far as possible regarding the required data throughput. Problems then occur, in that DC-current paths, which can be hidden in the design of the data processing element, will be open for a longer period, thereby partially undoing this reduction, and also in that real-time processing may be no longer possible.

A second method for reducing energy consumption would be to use a data processing element, having an operating mode and a mode of reduced activity, and to switch between these modes, keeping the element in the latter mode as long as no operating is required, in which mode the consuming of energy is less than in the former mode. A data processing element having an operating mode and modes of reduced activity is for example the single-chip 8-bit microcontroller PCB80C31, (Philips Data Handbook IC14N, 1985, pp. 187-213). This element has a mode of reduced activity called the idle mode, in which mode the CPU is frozen, while the RAM, timers, etcetera continue functioning, and a mode of further reduced activity, called the stop mode, in which mode the RAM contents are saved but the oscillator is frozen causing all & other chip functions to be inoperative. The energy consumed in the stop mode per unit time can be ignored with respect to the energy consumed in the idle mode. The idle mode as well as the stop mode are activated by software.

SUMMARY OF THE INVENTION

It is an object of the present invention to reduce the energy consumption by using a data processing element, having an operating mode and a stop mode, in which latter mode all element functions are inoperative but memory contents are saved, and connected to an oscillator, which oscillator is frozen in a stand-by mode while the data processing element is in the stop mode and which oscillator is operative while the data processing element is in the operating mode.

The invention is characterized in that data processing apparatus of the type set forth in the field of the invention further comprises:
switching means, interconnected between said second power supply terminal means and said oscillator means, the switching means having a first control input for detecting an interrupt signal produced by said data receiving module for thereupon driving said switching means to an operating power transmitting state for said second supply terminal means and a second control input fed by said stop signal output for upong detection of a stop signal generated by said data processing element driving said switching means to a stand-by power transmitting state for said second supply terminal means;
a transition signal detector connected between said switching means and said reset signal input for upon detecting any transition from said stand-by power transmitting state to said operating power transmitting state generating a reset pulse, that has a trailing edge occurring only after termination of said predetermined time interval.

The invention may adjust the oscillator frequency at the most advantageous value, given the system's task and limitations.

A direct consequence of freezing the oscillator in applications of a radio with a highly sensitive receiving part (e.g. a MODEM) is to diminish interference.

An eventual consequence of the invention is to realize a real-time processing in an economical way, as the clock frequency needs not be lowered.

BRIEF DESCRIPTION OF THE DRAWINGS

The invention will be described with reference to some Figures.

FIG. 3a, 3b 3c comprise the formulae according to which the optimal oscillator frequency can be determined.

Equations (1) through (9) determine the optimal oscillator frequency.

Equations (10) and (11) determine a frequency interval in which the oscillator frequency must lie in order to have an energy consumption higher by a fraction $\delta$ than the minimum. One can choose $\delta$ to be equal to, say, 10%, 50% or another value depending on one's preference.

Equations (12) through (15) determine a frequency interval in which the oscillator frequency must lie in order to keep the energy consumption, when the data processing element is switched between the operating mode and the stop mode, below the minimum of the energy consumption, when switching occurs between the operating mode and the idle mode.

Figure 4:
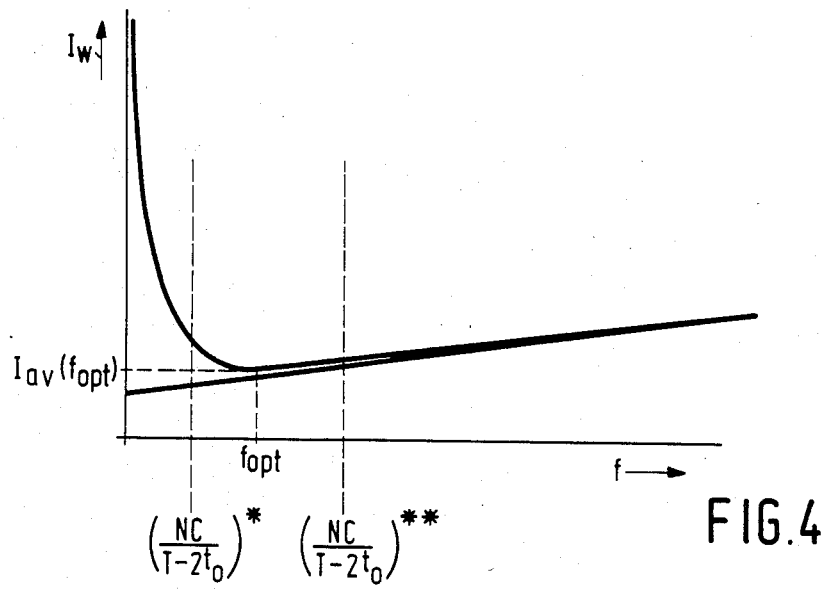

FIG. 4 is a typical graph of the average current consumed by the apparatus between two successive interrupts as a function of the frequency, according to the formulae of FIG. 3.

Figure 1:
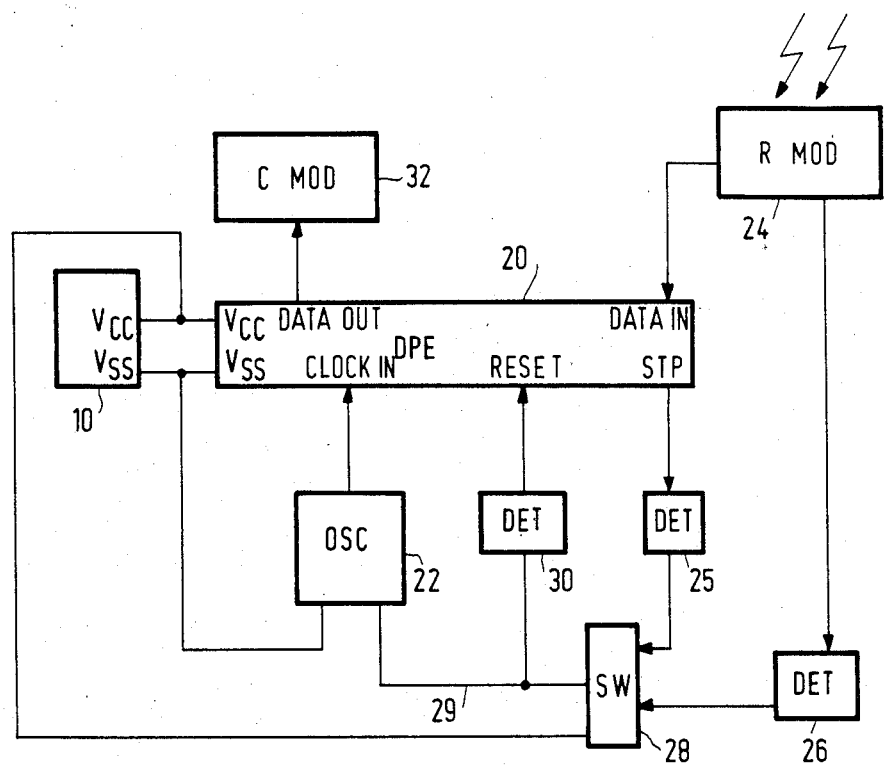
FIG. 1 shows a first block diagram of a data processing apparatus according to the invention.
Figure 5:
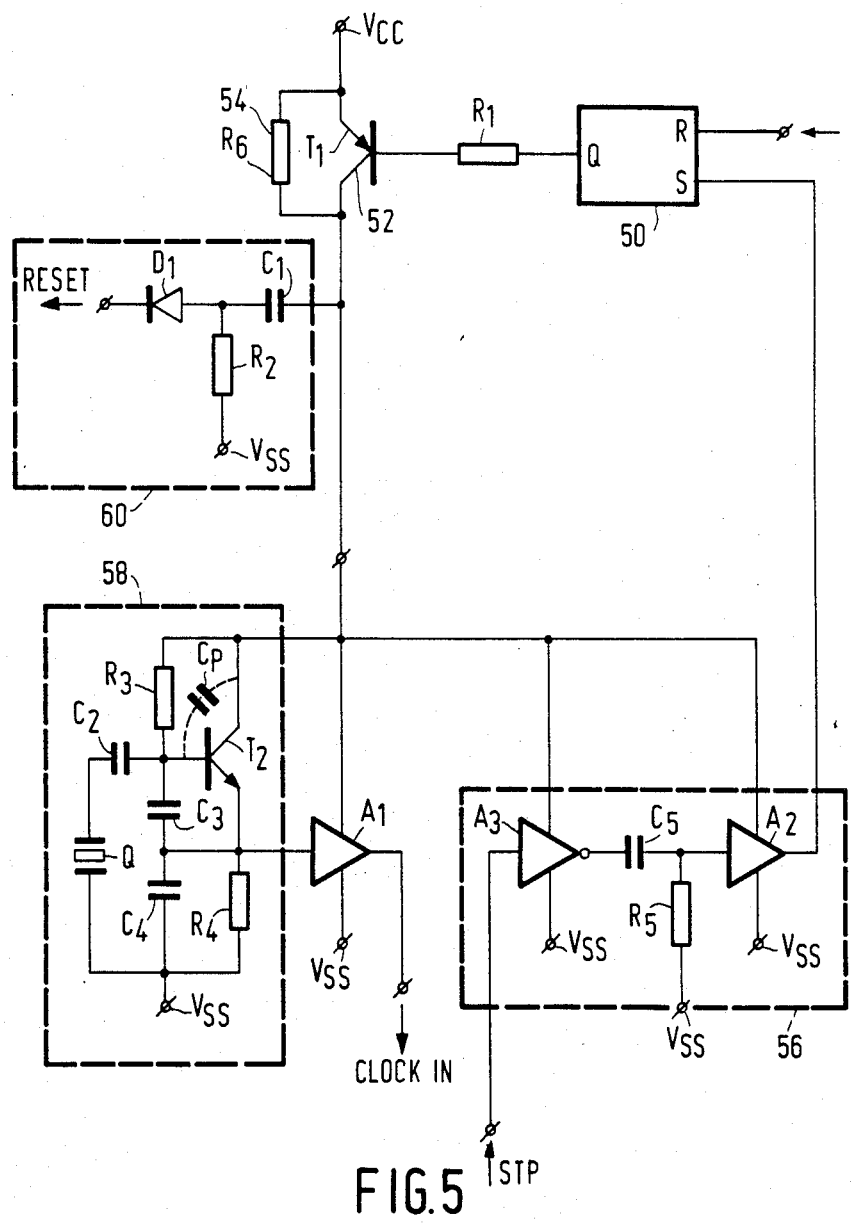

FIG. 5 pictures a circuit diagram of an oscillator, switching means and second signal detector, used in the preferred embodiment of the invention according to FIG. 1.

Figure 6:
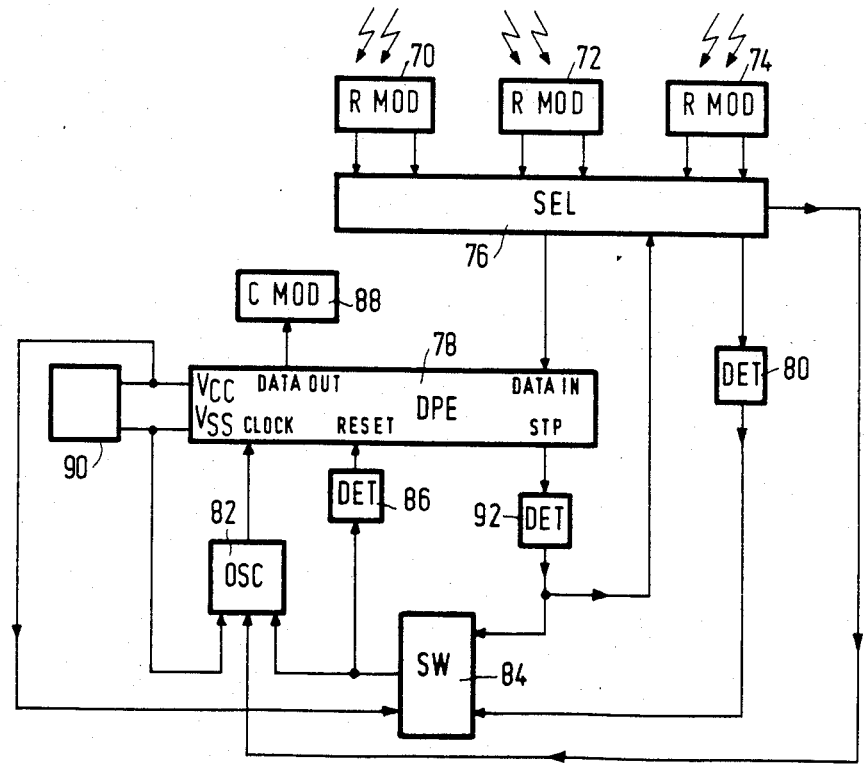

FIG. 6 gives a second block diagram of a data processing apparatus according to the invention.

Figure 7:
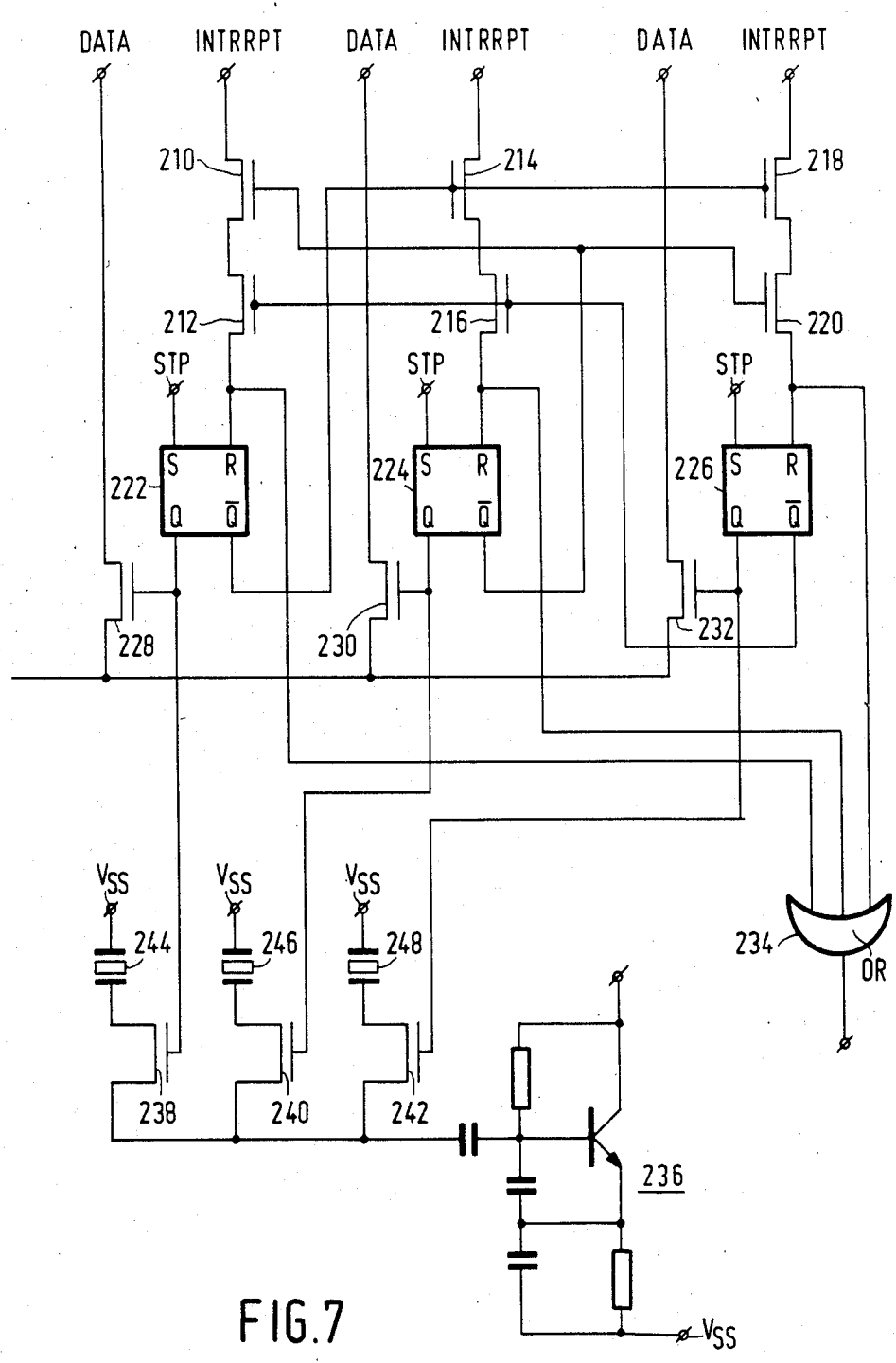

FIG. 7 is a hardware implementation of a preferred exemplary embodiment of the invention according to FIG. 6.

DESCRIPTION OF THE PREFERRED EMBODIMENT

FIG. 1 is a first block diagram of a data processing apparatus according to the invention. We assume data processing element 20 to be initially in the stop mode and oscillator 22 is to be standing by on a power supply level too low to enable oscillating. In this state energy consumption of the apparatus is negligible. At a certain moment data receiving module 24 receives data from an environment and sends an interrupt pulse to a signal detector 26. Upon receiving this pulse signal detector 26 gives off a signal to switching element 28, which thereupon provides full operating power to oscillator 22 via line 29. Thereupon oscillator 22 starts oscillating while signal detector 30 detects a voltage change on line 29 and for that sends a pulse of predetermined width to the reset signal input of data processing element 20. The width of the reset pulse is chosen to be larger than the time necessary to reach stable oscillation plus the time necessary for the reset operation proper. After termination of the reset pulse, data processing element 20 reads the data from data receiving module 24, processes the data as far as necessary and accordingly writes out data to data controlled module 32. When this task has been performed, data processing element 20 goes into the stop mode, which is activated by software, and sends thereby a stop signal via signal detector 25 to switching element 28, which thereupon switches the power supply to oscillator 22 from full supply to a stand-by supply.

BEHAVIOUR OF APPARATUS WITH TIME

Figure 2:
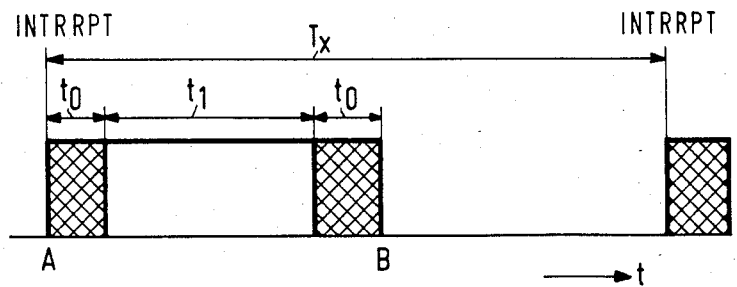
FIG. 2 represents the behaviour of the apparatus of FIG. 1 with time.

FIG. 2 shows an exemplary behaviour of the apparatus between two interrupts, lying a time $T_x$ apart. As soon as an interrupt is detected, which occurs at an instant A, the oscillator switches from its stand-by, non-oscillating mode to its oscillating mode, while the data processing element is reset into an initial state. This operation is completed before the end of the reset pulse. The length of the reset pulse $t_o$ is larger than the settling time of the oscillator as the reset operation requires stable oscillations. In practice $t_o$ is made much larger than this settling time of the oscillator in order to stay within a safety range to guarantee a reset taking place under varying conditions (e.g. temperature drift). After termination of the reset pulse, the data processing element becomes operating. The task of the data processing element takes a time $t_1$. At the end of this time interval $t_1$ the data processing element goes into the stop mode under software control, thereby putting the oscillator into the stand-by mode via a stop signal, the data processing element requiring a time $t_o$ to settle in its stop mode. For conversion it is assumed that the time $t_o$ for reaching the initial state equals the time for reaching the stop mode. At instant B the apparatus is ready again to accept a next interrupt.

CALCULATION OF THE ENERGY CONSUMPTION

FIG. 3 comprises the formulae according to which the optimal oscillator frequency is determined in order to minimize energy consumption. In formula (1), is defined the duty cycle of the system which is the fraction of the interval between two successive interrupts, in which the system is operating. As indicated this duty cycle is represented by a number between zero and one. Because the supplies voltages ($V_{CC}$ and $V_{SS}$) are kept constant, the average current $I_{av}$ must be minimized. In formula (2) is given the average amount of current passing through the data processing element between two successive interrupts. In the first instance the oscillator current is ignored because it is relatively small. This average current consists of a first part, present during operating, and a second part, present during the stop mode. The current $I_{op}$ necessary in the operating mode depends approximately linearly on the clock frequency f and also on parameters $\alpha$ and $\beta$, determined by the silicon characteristics of the data processing element within the frequency interval of interest and is stated by formula in the stop mode $I_{stop}$ is a constant and very much smaller than the operating current and is given by formula (4). The duty cycle (1) too depends on the frequency via the duration of the period, in which the data processing element is in the operating mode, this period being a function of the frequency, the number of instructions N executed within this period and the average number of clock cycles per instruction C. The expression for this period in these terms is formula (5). As the duty cycle (1) equals one or is smaller than one, formulae (1) and (5) determine a lower limit for the usable oscillator frequency, at which it is just possible to execute the given number of instructions between two successive interrupts. This lowest usable D frequency is given in formula (6). Substituting (3) and (4) into (2), (5) into (1), and (1) thereafter into (2), gives formula (7). Minimizing expression (7) with respect to the frequency leads to the optimal frequency $f_{opt}$ of formula (8). Finally, the current consumed by the data processing element, clocked with frequency (8) in the operation mode, is the minimum, represented by formula (9). However, it must be checked whether this optimal frequency is permitted, since there exists a lower frequency limit, which is given by formula (6). This problem will be discussed in the light of FIG. 4.

DESCRIPTION OF A TYPICAL REALIZATION

An exemplary data processing apparatus is a portable telephone forming a part of a Portable Automatic Telephone System. Such a portable telephone comprises a modulator/demodulator connected to a microcontroller, e.g. a PCB80C31 (Philips Data Handbook IC14N, 1985, pp. 187-213). Typical values for some quantitites characterizing a PCB80C31 - microcontroller are: $\alpha = 1.3 \times 10^{-9}$ Asec; $\beta = 8 \times 10^{-4}$A; $\theta = 5 \times 10^{-5}$A; $t_o = 10^{-3}$sec; $C = 20$. If information packets enter the telephone every $T = 0.5$ sec, each packet requiring an amount of $N = 2080$ instructions to be executed, the most profitable oscillator frequency is equal to 3.5 MHz, as can be calculated with the formulae in FIG. 3. In this application the invention yields profit in that the frozen oscillator cannot cause interference with identification bits in each information packet. As a consequence the receiving part of the data processing apparatus may be constructed as a highly sensitive receiver.

TYPICAL GRAPH OF ENERGY CONSUMPTION VERSUS FREQUENCY

FIG. 4 is a typical graph of the average current consumed by the data processing element between two successive interrupts as a function of the clock frequency, this information being comprised in formula (7) and being of the form: $I_{av}=Kf+M/f+L$, K, L, M are constants specified in formulae (1) through (5).

We distinguish two cases:

(1) lowest usable frequency, as given in formula (6), is smaller than or equal to the optical frequency of formula (8).

(2) The lowest usable frequency (6) is larger than or equal to the optimal frequency (8). Whether the optimal frequency is larger than the lowest usable frequency or not depends on the silicon parameters in formula (3), on the amount of clock cycles, necessary for the data processing element to execute the required instructions, on the interrupt rate and on the settling time of the data processing element. In case (1) the most profitable frequency is equal to the optimal frequency of formula (8) in order to have a minimum energy consumption.

In case (2) the most profitable frequency at which the energy consumption is at a minimum equals the lowest usable frequency. For case (1) the lowest usable frequency lies on the left of the optical frequency in FIG. 4 and is marked with a single asterisk, whereas for case (2) the lowest usable frequency lies on the right of the optimal frequency and is marked with double asterisks.

CALCULATION OF A NEAR OPTIMUM REGION

To obtain a low energy consumption within a fraction δ of the attainable minimum in practice, say 10%, the frequency must lie in the frequency interval given by formulae (10) in case (1), or in the frequency interval of formulae (11) in case (2) as can readily be deduced from formulae (6) to (9). When, instead of switching between the stop mode and the operating mode, the switching between the idle mode and the operating mode is used, the settling time, the amount of instructions to be executed and the interrupt rate being the same, the average current consumption is given by formula (13), in which formula is substituted the (approximate) current - against-frequency—characteristic of the data processing element in the idle mode (12) within the frequency interval of interest. Typical values for the parameters characteristic for a PCB80C31 microcontroller are: $\Sigma=2.5\times10^{-10}$ Asec; $\lambda=7\times10^{-4}$A. Optimizing formula (13) with respect to the frequency delivers the minimum current consumption (14). This minimum current consumption (14) when the idle mode is used exceeds the minimum current consumption (9) using the stop mode. For keeping the energy consumption of the data processing element, when switched between the operating mode and the stop mode, below the energy consumption of the data processing element that can be attained by switching between the operating mode and the idle mode, the clock frequency must lie in the frequency interval of expression (15) as can be calculated by using formulae (7) and (14).

DETAILED DESCRIPTION OF AN EXEMPLARY CIRCUIT

FIG. 5 pictures a circuit diagram of the oscillator, switching element and the second signal detector, used in the preferred embodiment of the invention according to the block diagram of FIG. 1.

In FIG. 5 the switching element comprises a reset-set-flipflop 50, pnp-transistor 52, resistor 54 and a signal detecting circuit 56. The oscillator 58 is chosen to be a Colpitts-oscillator for its excellent frequency stability, short response time and high oscillating frequency. The output signal is buffered by amplifier $A_1$. The signal detector 60 is a differentiating circuit, having a diode $D_1$ connected to its output, in order to reset the data processing element only when the detector senses an upgoing voltage change. Resistor 54 is chosen to be of high resistance to supply the oscillator 58 with a stand-by current in its stand-by mode, in order to prevent the parasitic capacitor $C_p$ between the control electrode and collector of transistor $T_2$ in the oscillator 58 from discharging completely, this capacitor being charged while the oscillator is in the operating mode. In this way the settling time of the oscillator is kept sufficiently low. The reset input of flipflop 50 is connected to the output terminal of the first signal detector 26 in FIG. 1, the set input of flipflop 50 is connected to the stop signal output of the data processing element 20 via a signal detecting circuit 56, which takes care of supplying the flipflop with a set signal of the right polarity and duration. The data processing apparatus can be made accessible for other than the previously mentioned interrupt signal for generating a reset of the data processing element e.g. by feeding the reset terminal of flip-flop 50 via an OR-gate (not shown). Amplifiers $A_1$, $A_2$ and $A_3$ are fully supplied via transistor 52 when the oscillator needs operating and are kept on a small stand-by supply when the oscillator is in the stand-by mode. A second interrupt following immediately a first interrupt is harmless because of the input/output characteristics of reset-set-flipflop 50.

DESCRIPTION OF AN EXTENDED EMBODIMENT

In FIG. 6 is given a second block diagram of a data processing apparatus according to the invention. This second block diagram differs from that of FIG. 1 in having three data receiving modules for receiving data from an environment 70, 72 and 74 instead of one, a selection device 76 connected between these data receiving modules and the data input of data processing element 78, and a clock 82, comprising three different oscillator circuits instead of one oscillator as is the case in FIG. 1.

Upon reception of an interrupt signal from one data receiving module, for example data receiving module 70, selection device 76 connects the data output of data receiving module 70 to the data input of data processing element 78, feeds this interrupt signal to signal detector 80 and selects in clock 82 an oscillator circuit, thereby disabling transmission of data or of interrupt signals from data receiving modules 72 and 74 to said data input or signal detector 80 respectively. The selected oscillator circuit comprises a resonance circuit which fixes the adapted clock frequency of the pulses, fed into the clock input of data processing element 78. The adapted clock frequencies are determined as is described with the help of FIGS. 3 and 4 and depend among others on the amount of instructions to be executed, required by the data throughput of the data receiving modules 70.

After execution of the instructions required by data receiving module 70, data processing element 78 sends a stop signal to selection device 76 via signal detector 92, which thereby disconnects the data output of data receiving module 70 from said data input and restores the connection from the interrupt signal outputs of data receiving modules 72 and 74 to signal detector 80. The operation of the apparatus of FIG. 6 is further analogous to that of the apparatus of FIG. 1.

DETAILED DESCRIPTION OF A SECOND EXEMPLARY CIRCUIT

In FIG. 7 a hardware implementation is given of the selection device 76 and clock circuit 82 in FIG. 6. Although the embodiment of the invention in FIG. 6 comprises only three data receiving modules, extension to more data receiving modules is straightforward. Therefore the former case will be examined.

Data receiving modules 70, 72 and 74 in FIG. 6 have their data outputs connected to the data input of data processing element 78 via transistors 228, 230 and 232 respectively, and have their interrupt signal outputs connected to the reset terminals of reset-set-latches 222, 224 and 226 via two transistors in series 210/212, 214/216 and 218/220 respectively.

The set terminal of each reset-set-latch is connected to the stop signal output of data processing element 78 via a signal detector 92. The first latch output terminals of reset-set-latches 222, 224 and 226 are connected to the control electrode of transistors 228, 230 and 232 respectively. The second latch output terminal of reset-set-latch 222 is connected to the control electrode of transistors 214 and 218, the second latch output terminal of reset-set-latch 224 is connected to the control electrode of transistor 210 and 220 and the second latch output terminal of reset-set-latch 226 is connected to the control electrode of transistors 212 and 216. The reset terminal of each reset-set-latch is connected to an input terminal of an OR-gate 23. The output terminal of said OR-gate is connected to the input of signal detector 80 in FIG. 6. The first latch output terminals of reset-set-latches 222, 224 and 226 are connected to the control electrode of transistors 238, 240 and 242 respectively.

We assume the data processing element 78 in FIG. 6 initially to be in the stop mode, which mode determines the initial state of reset-set-latches 222, 224 and 226. In this initial state transistors 228, 230, 232 238, 240 and 242 are blocked, while transistors 210/212, 214/216 and 218/220 are conducting. At a certain moment one of the data receiving modules sends an interrupt signal, for instance data receiving module 70. This signal passes through transistors 210/212 and switches the state of reset-set-latch 222. Thereupon transistor 228 is rendered conducting thereby connecting the data output of data receiving module 70 to said data input and transistors 214 and 218 are blocked, thereby preventing reset-set-latches 224 and 226 from switching. At the same time, signal detector 80 receives via OR-gate 234 the interrupt signal and an oscillator circuit, comprising resonant circuit 244, is selected in clock circuit. As soon as the data processing element sends a stop signal, reset-set-latch 222 is switched back, which leads to the blocking of transistors 228 and 238 and the conducting of transistors 214 and 218. Then the apparatus is ready again to manage a new interrupt signal.

What is claimed is:

1. A data processing apparatus, comprising:
   a. data processing element, having an operating mode and stop mode, said element comprising:
      i. a data input;
      ii. a first data output;
      iii. a reset signal input;
      iv. a clock input;
      first power supply terminal means; and
      vii. rest means for, under combined control of a series of clock pulses and a reset signal on said rest signal input, attaining an initial state within a redetermined time interval;
   b. oscillator means for feeding said clock input with clock pulses, said oscillator means having second power supply terminal means;
   c. a data receiving module for receiving external data, aid module having a second data output connected to the data input;
   d. switching means, disposed within the data processing element, and connected between said second power supply terminal means and said oscillator means, the switching means having:
      i. a first control input for detecting an interrupt signal produced by said data receiving module and for, upon detecting said interrupt signal, causing said switching means to assume an operating power transmitting state for said second supply terminal means;
      ii. a second control input, fed by said stop signal, for, upon detection of a stop signal generated by said data processing element, driving said switching means to a stand-by power transmitting state for said second supply terminal means;
   e. a transition signal detector, connected between said witching means and said reset signal input, for, upon detecting any transition form said stand-by power transmitting state to said operating power transmitting state, generating a rest pulse, that has a trailing edge occurring only after termination of said predetermined time interval
   characterized in that said switching means comprises:
      i. rest-set-latch having a rest input, a set input, and an output terminal;
      an interrupt-signal-detector feeding said reset input and connected to said first control input for detecting the interrupt signal produced by said data receiving module;
      ii. a stop-signal detector connected to said set input and said second control input and fed by said stop signal output for detecting the stop signal; and
      iii. a transistor having a control electrode connected to said output terminal and having a conduction path connected between an input of said transition-signal detector and said second power supply means.

2. A data processing apparatus as claimed in claim 1, wherein said data processing element has, within frequency interval of interest, in interest, in its operating mode current I - versus - frequency f - characteristic approximated by $I=\alpha f+\beta$, an additional mode of reduced activity (idle mode) in which mode said data processing element has within the frequency interval of interest a current I - versus - frequency f - characteristic approximated by $I=\Sigma f+\lambda$, all of $\alpha$, $\beta$, $\Sigma$ and $\lambda$ being larger than zero, in its stop mode a current $I=\theta<<\beta$ passing through it, a settling time $t_o$, and is used for the execution of an average number of N instructions between two of said successive interrupts, the average interrupt rate being one interrupt per period T, T>$2t_o$, while the average number of clock cycles per instruction equals a number C, depending on the type of said data processing element, characterized in that, when NC/T−$2t_o$) is smaller than X+$(X^2-Y)^{\frac{1}{2}}$, the frequency f of the clock pulses fed by said oscillator means lies in the frequency interval $$\text{Max}\left\{\frac{NC}{T-2t_o}X - (X^2 - Y)^{\frac{1}{2}}\right\} \leq f \leq X + (X^2 - Y)^{\frac{1}{2}}$$

wherein $$X \approx (((\beta - \lambda)(\Sigma T + 2t_o\alpha)NC)^{\frac{1}{2}})/2t_o\alpha + (\lambda T - NC\Sigma)/4t_o$$

$$Y: = \frac{NC}{2t_o\alpha}$$

for keeping the average energy consumption of said data processing element when switched between said operating mode and said stop mode below the minimum average energy consumption of said data processing element that can be attained by switching between said operating mode and said idle mode.

3. A data processing apparatus as claimed in claim characterized in that when the expression:

$$\frac{NC}{T-2t_o} \leq \left(\frac{NC}{2t_o\alpha}\right)^{\frac{1}{2}}$$

is valid, the frequency f of the clock pulses fed by said oscillator means lies in the frequency interval:

$$\text{Max}\left\{\frac{NC}{T-2t_o}, P - (P^2 - Q)^{\frac{1}{2}}\right\} \leq f \leq P + (P^2 - Q)^{\frac{1}{2}}$$

wherein $$P \approx ((NC\beta)/(2t_o\alpha))^{\frac{1}{2}} + 0.1 \cdot \{((NC\beta)/(2t_o\alpha))^{\frac{1}{2}} + \beta/2\alpha +$$

$$NC/4t_o\alpha + \theta T/4t_o\alpha\}$$

$$Q: = \frac{NC\beta}{2t_o\alpha};$$

and that when the expression:

$$\frac{NC}{T-2t_o} \geq \left(\frac{\beta NC}{2t_o\alpha}\right)^{\frac{1}{2}}$$

is valid, the frequency f of the clock pulses fed by said oscillator means lies in the frequency interval:

$$\frac{NC}{T-2t_o} \leq f \leq R + \{R^2 - Q\}^{\frac{1}{2}}$$

wherein $$R \approx NC/2T + \beta T/4\alpha t_o + 0.1 (NC/4t_o + \beta T/4\alpha t_o)$$

$$Q: = \frac{NC\beta}{2t_o\alpha}$$

for attaining an average energy consumption of at most 1.1. times the minimum average energy consumption.

4. A data processing apparatus as claimed in claim 2, 3 or 4 comprising at least a first and a second receiving module, each having a respective second data output for forwarding data to said data processing element and a respective interrupt signal output for sending the interrupt signal characterized in that the data processing apparatus furthermore comprises:
a selection means fed in parallel by said second data outputs and fed in parallel by said interrupt signal outputs,
said selection means having:
first gating means for gating a first received interrupt signal to said first control input;
second gating means for gating data associated to said first received interrupt signal to said data processing element;
disabling means for upon reception of said first received interrupt signal disabling said first and second gating means for gating any interrupt signal or data from another data receiving module than the one generating said first received interrupt signal;
enabling means connected to said second control input for upon reception of said stop signal reenabling said first and second gating means.

5. A data processing apparatus as claimed in claim 4, characterized in that said oscillator means comprise a plurality of oscillator circuits, each for generating clock pulses of an associated frequency, and a selection input connected to said selection means for upon reception of a selection signal thereupon selecting one oscillator circuit to be connected to said clock output, between said selection means receiving an interrupt signal and the next following stop signal.

6. A data processing apparatus as claimed in claim 1, comprising at least a first and a second data receiving module, each having a respective second data output for forwarding data to said data processing element and a respective interrupt signal output for foresending the interrupt signal characterized in that the data processing apparatus furthermore comprises:
a selection means fed in parallel by said second data outputs and fed in parallel by said interrupt signal outputs, said selection means having:
first gating means for gating a first received interrupt signal to said first control input; p1 second gating means for gating data associated to said first received interrupt signal to said data processing element;
disabling means for upon reception of said first received interrupt signal disabling said first and second gating means for gating any interrupt signal or data from another data receiving module than the one generating said first received interrupt signal;
enabling means connected to said second control input for upon reception of said stop signal reenabling said first and second gating means.

7. A data processing apparatus as claimed in claim 6, having a number of j≧2 data receiving modules, each having a respective second data output and a respective interrupt signal output, characterized in that said selection means comprises:
a number of j reset-set-latches, each having its set terminal connected to said stop-signal detector;
a number of j AND-gating means, each having (j−1) gate inputs and connecting a respective interrupt signal output to an associated reset terminal;
a number of j interface gating means, each connecting a respective second data output to the data input and having a blocking state, a passing state and a state control input connected to a first output terminal of an associated reset-set-latch, for upon reception of a blocking-signal being driven to the blocking state and upon reception of a pass-signal being driven to the passing state;

a j-input OR-gating means fed by said j reset terminals and feeding the interrupt-signal detector; whereby AND-gating means of rank number k, $1 \leq k \leq j$, connecting data receiving module number k to reset-set-latch number k, has its (j−1) gate inputs connected to respective second output terminals of reset-set-latches with numbers $m \neq k$, $1 \leq m \leq j$.

8. A data processing apparatus comprising:
a. a data processing element, having an operating mode and a top mode, said element comprising:
   i. a data input;
   ii. a first data output;
   iii. a reset signal input;
   iv. a clock input;
   v. a stop signal output;
   vi. first power supply terminal means; and
   vii. reset means for, under combined control of a series of clock pulses and a reset signal on said reset signal input, attaining an initial state within a predetermined time interval;
b. oscillator means for feeding said clock input with clock pulses, said oscillator means having second power supply terminal means;
c. a data receiving module for receiving external data, said module having a second data output connected to the data input;
d. switching means, disposed within the data processing element, and connected between said second power supply terminal means and said oscillator means, the switching means having:
   i. a first control input for detecting an interrupt signal produced by said data receiving module and for, upon detecting said interrupt signal, causing said switching means to assume an operating power transmitting state for said second supply terminal means;
   ii. a second control input, fed by said stop signal, for, upon detection of a stop signal generated by said data processing element, driving said switching means to a stand-by power transmitting state for said second supply terminal means;
e. a transition signal detector, connected between said switching means and said reset signal input, for, upon detecting any transition from said stand-by power transmitting state to said operating power transmitting state, generating a reset pulse, that has a trailing edge occurring only after termination of said predetermined time interval wherein
said data processing element has, within a frequency interval of interest, in its operating mode a current I - versus frequency f - characteristic approximated by $I = \alpha f + \beta$, an additional mode of reduced activity (idle mode) in which mode said data processing element has within the frequency interval of interest a current I - versus- frequency f - characteristic approximated by $I = \Sigma f + \lambda$, all of $\alpha$, $\beta$, $\Sigma$ and $\lambda$ being larger than zero, in its stop mode a current $I = \theta << \beta$ passing through it, a settling time $t_o$, and is used for the execution of an average number of N instructions between two of said successive interrupts, the average interrupt rate being one interrupt per period T, $T > 2t_o$, while the average number of clock cycles per instruction equals a number C, depending on the type of said data processing element, characterised in that,
when $(NC/T - 2t_o)$ is smaller than $X + (X^2 - Y)^{\frac{1}{2}}$, the frequency f of the clock pulses fed by said oscillator means lies in the frequency interval $$\text{Max}\left\{ \frac{NC}{T - 2t_o} X - (X^2 - Y)^{\frac{1}{2}} \right\} \leq f \leq X + (X^2 - Y)^{\frac{1}{2}}$$

wherein $$X \cong (((\beta - \lambda)(\Sigma T + 2t_o \alpha)NC)^{\frac{1}{2}}/2t_o\alpha + (\lambda T - NC\Sigma)/4t_o$$

$$Y = \frac{NC}{T - 2t_o\alpha}$$

for keeping the average energy consumption of said data processing element when switched between said operating mode and said stop mode below the minimum average energy consumption of said data processing element that can be attained by switching between said operating mode and said idle mode.

9. A data processing apparatus comprising:
a. a data processing element, having an operating mode and a
a. a data processing element, said element comprising:
   i. a data input;
   ii. a first data output;
   iii. a reset signal input;
   iv. a clock input;
   v. a stop signal output;
   vi. a first power supply terminal means; and
   vii reset means for, under combined control of a series of clock pulses and a rest signal on said reset signal input, attaining an initial state within a predetermined time interval;
b. oscillator means for feeding said clock input with clock pulses, said oscillator means having second power supply terminal means;
c. a data receiving module for receiving external data, said module having a second data output connected to the data input;
d. switching means, disposed within the data processing element, and connected between said second power supply terminal means and said oscillator means, the switching means having:
   i. a first control input for detecting an interrupt signal produced by said data receiving module and for, upon signal produced by said data receiving module and for, upon detecting said interrupt signal, causing said switching means to assume an operating power transmitting state for said second supply terminal means;
   ii. a second control input, fed by said stop signal, for, upon detection of a stop signal generated by said data processing element, driving said switching means to a stand-by lower transmitting state for said second supply terminal means;
e. a transition signal detector, connected between said switching means and said rest signal the expression input, for, upon detecting any transition form said stand-by power transmitting state to said operating power transmitting state, generating a reset pulse, that has a trailing edge occurring only after termination of said predetermined time interval
characterized in that
when the expression $$\frac{NC}{T - 2t_o} \leq \left(\frac{NC}{2t_o\alpha}\right)^{\frac{1}{2}}$$

is valid, the frequency f of the clock pulses fed by said oscillator means lies in the frequency interval:

$$\text{Max}\left\{\frac{NC}{T - 2t_o}, P - (P^2 - Q)^{\frac{1}{2}}\right\} \leq f \leq P + (P^2 - Q)^{\frac{1}{2}}$$

wherein $$P \cong ((NC\beta)/(2t_o\alpha))^{\frac{1}{2}} + 0.1 \cdot \{((NC\beta)/(2t_o\alpha))^{\frac{1}{2}} +$$

$$\beta/2\alpha + NC/4t_o\alpha + \theta T/4t_o\alpha\}$$

$$Q := \frac{NC\beta}{T - 2t_o\alpha}$$

and that when the expression:

$$\frac{NC}{T - 2t_o} \geq \left(\frac{\beta NC}{2t_o\alpha}\right)^{\frac{1}{2}}$$

is valid, the frequency f of the clock pulses fed by said oscillator means lies in the frequency interval $$\frac{NC}{T - 2t_o} \leq f \leq R + (R^2 - Q)^{\frac{1}{2}}$$

where $$R \cong NC/2T + \beta T/4\alpha t_o + 0.1(NC/4t_o + \beta T/4\alpha t_o)$$

for attaining an average energy consumption of at most 1.1 times the minimum average energy consumption.

10. A data processing apparatus as claimed in claim 1, 8 or 9, characterized in that at least one data controlled module is connected to said first data output.

11. A data processing apparatus comprising:
a. first and at least one second data receiving modules for receiving external data, said modules each having:
   i. a respective first data output; and
   ii. a respective interrupt signal output for resending an interrupt signal;
b. a data processing element, having an operating mode and a top mode, said element comprising:
   i. a data input coupled, in parallel, to the first data outputs;
   ii. a second data output;
   iii. a rest signal input;
   iv. a clock input;
   v. a stop signal output for providing a stop signal;
   vi. first power supply terminal means;
   vii. reset means for, under combined control of a series of clock pulses and a reset signal on said reset signal input, attaining an initial state within a predetermined time interval; and
   viii. election means, fed in parallel by the outputs of the data receiving modules, and having:
      A. first gating means for gating a first received interrupt signal from the first receiving module;
      B. second gating means for gating data associated with said first received interrupt signal to said data processing element;
      C. disabling means for, upon reception of said first received interrupt signal, disabling said first and second gating means from gating any interrupt signal or data from said second data receiving module; and
      D. enabling means for, upon receipt of said stop signal, re-enabling said first and second gating means;
c. oscillator means for feeding said clock input with clock pulses, said oscillator means having second power supply terminal means;
d. switching means, disposed within the data processing element, and connected between said second power supply terminal means and said oscillator means, the switching means having:
   i. a first control input, coupled with an output of said first gating means, for detecting an interrupt signal and for, upon detecting said interrupt signal, causing said switching means to assume an operating power transmitting state for said second supply terminal means; and
   ii. a second control input, connected to said enabling means and fed by said stop signal, for, upon detection of said stop signal, driving said switching means to a stand-by power transmitting state for said second supply terminal means;
e. a transition signal detector, connected between said switching means and said rest signal input, for, upon detecting any transition from said stand-by power transmitting state to said operating power transmitting state, generating a reset pulse, that has a trailing edge occurring only after termination of said predetermined time interval.

12. A data processing apparatus as claimed in claim 1, 2, 9, or 11 further comprising a resistor for, while said data processing element is in said stop mode, connecting between said second power supply terminal means and said oscillator means, as a pass-by for a stand-by current.

13. A data processing apparatus as claimed in claim 1, 8, 9, or 11, characterized in that the data processing apparatus further comprises first amplifier means having third power supply terminal means connected to said second power supply terminal means, for amplifying said clock pulses.

14. A data processing apparatus as claimed in claim 13, characterized in that the data processing apparatus further comprises second amplifier means having fourth power supply terminal means connected to said second power supply terminal means, for amplifying said stop signal.

* * * * *